(12) United States Patent
Yagi et al.

(10) Patent No.: US 6,784,435 B2
(45) Date of Patent: Aug. 31, 2004

(54) UV DETECTOR AND METHOD OF MEASURING UV INTENSITY AND DOSE USING THE SAME

(75) Inventors: Shigeru Yagi, Minamiashigara (JP); Osamu Ohtani, Minamiashigara (JP); Hisayoshi Mori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 252 days.

(21) Appl. No.: 10/200,226

(22) Filed: Jul. 23, 2002

(65) Prior Publication Data

US 2003/0107005 A1 Jun. 12, 2003

(30) Foreign Application Priority Data

Dec. 12, 2001 (FR) ........................................ 2001-378843

(51) Int. Cl.$^7$ ................................................. G01J 1/42
(52) U.S. Cl. ..................................... 250/372; 250/336.1
(58) Field of Search .............................. 250/336.1, 372, 250/472.1, 473.1, 474.1, 475.2, 482.1

(56) References Cited

U.S. PATENT DOCUMENTS 6,483,116 B1 * 11/2002 Kozlowski et al. ......... 250/372

* cited by examiner

*Primary Examiner*—Constantine Hannaher
*Assistant Examiner*—Timothy J. Moran
(74) *Attorney, Agent, or Firm*—Oliff & Berridge, PLC

(57) ABSTRACT

A UV detector is located at an arbitrary measuring position on an object on which UV intensity and dose are measured and measures the UV intensity and dose at the measuring position. The receptor includes a UV photo-receiving device having a photosemiconductive layer containing nitrogen and at least one of elements of Al, Ga and In, and a UV untransmissive member having a function of preventing UV transmitted through the UV receiving device from being received by the object.

7 Claims, 2 Drawing Sheets

UV DETECTOR AND METHOD OF MEASURING UV INTENSITY AND DOSE USING THE SAME

BACKGROUND OF THE INVENTION

1. Field of the Invention

This invention relates to a UV detector having a novel structure and UV intensity and dose measuring method using the same.

2. Description of the Related Art

In recent years, UV or short wavelength lights have been utilized industrially in various fields. Particularly, UV has been utilized vigorously to improve resolutions upon exposure in production steps of semiconductor integrated circuit devices. Along with super micro miniaturization of semiconductor integrated circuit devices in recent years, light sources of UV used in photo-lithographic steps by demagnification optical systems of production steps have been shifted from mercury lamps (365 nm) to excimer lasers of a shorter length such as KrF (248 nm) or ArF (193 nm). As described above, when lights (also including UV or shorter wavelength lights) are utilized industrially, a technique of accurately measuring the intensities of such lights has been required.

Further, effects of UV in sunlight on human bodies have brought about a significant problem and the requirement for the technique of accurately measuring the UV-intensity and dose has increased more.

Heretofore, for measurement of UV intensity, apparatuses having a combination of a panchromatic detector such as a silicon photodiode with a long wavelength cut-off/short wavelength transmitting filter and a long wavelength cut-off/short wavelength transmitting filter for cutting-off secondary light transmission in the visible region of the filter have been used as UV detectors. However, such cut-off filters involve problems that it is difficult to obtain a favorable combination, sensitivity to UV is lowered by superimposing the filters and, further, they show large errors with transmitting visible light or significant aging change due to deterioration of filter, and the working life is short.

In addition, the silicon photodiode involves a problem that light does not reach an active portion due to surface absorption in a case of measuring light at short wavelength, or the sensitivity is lowered at a wavelength of 400 nm or less, for example, by recombination due to surface defects. Further, it also involves a problem that the sensitivity fluctuates greatly depending on the wavelength at 300 nm or less, so that no accurate light or intensity and dose can be determined.

For the measurement of UV intensity, a UV detector including a semiconductor having sensitivity to short wavelength such as GaP with a long wavelength cut-off/short wavelength transmitting filter is also used. Also in this case, since the receptor has a sensitivity to a secondary light region in a case of UV at 300 nm or less, it is necessary for a short wavelength transmitting/long wavelength cut-off filter for cutting-off the secondary light transmitting area. Such a cut-off filter is expensive since the material constituting the cut-off filter for transmitting the light in the short wavelength region is limited. As a result, the UV detector in such a region has a short life and low sensitivity while it is expensive.

For the short wavelength transmitting filter as described above, since the angle dependence of the filter is large for obtaining aimed UV, the deflection for the incident angle has to be reduced as much as possible for accurate measurement of intensity and dose in the aimed wavelength region and, ideally, vertical incidence of light is desired. Then, the length of the light guide portion to the receptor has to be increased inevitably in order to keep the optical channel vertical and the length increases as the accuracy of the receptor is higher to result in a problem that the size of the photoreceptor is enlarged.

Further, in UV detectors, for accurately measuring the intensity of UV, it is necessary to use a photo-receiving device conforming to the so-called cosθ rule for the distribution of the incident angle for measurement of UV from all directions. As an ideal UV detector, it is desirable to use a photo-receiving device which is reduced in size and conforms to the cosθ rule as much as possible. However, in the photo-receiving device conforming to the cosθ rule up to about an angle of 60°, the thickness is limited to 8 to 10 min (data reported in Illumination Society). Accordingly, the extent for the distribution of the incident angle for measurement and the thickness of the photo-receiving device conflict with each other.

Meanwhile, the UV detector is adapted to measure the UV intensity and dose on an object while being in contact or adjacent with the object. In a case of a UV detector using a transparent nitride semiconductor, incident light at a portion of a long wavelength that is transmitted while undergoing attenuation by absorption of the nitride semiconductor reflects on the surface of the object and then enters again to the nitride semiconductor and, as a result, a problem arises that the spectral characteristic and the output are changed. Particularly, the amount of change increases depending on the color of the object, and accurate measurement for the UV intensity and dose is difficult. Specifically, in a case for example, where a UV detector is used while it is disposed on humans skin, the spectral sensitivity characteristic and the output are changed due to the difference of the color of skin.

SUMMARY OF THE INVENTION

This invention has been made in view of the above circumstances and provides a UV detector capable of accurately measuring the UV intensity for a wide incident angle with no change of the spectral sensitivity characteristic or output, irrespective of a color of an object on which the UV intensity and dose measurement is carried out, as well as a method of measuring the UV intensity and dose using the same.

That is, this invention provides a UV detector which is located at an arbitrary measuring position on an object and measures UV intensity and dose at the measuring position. The UV detector includes a UV receiving device having a photosemiconductive layer containing at least one of elements of Al, Ga and In, and nitrogen, and a UV untransmissive member having a function of preventing UV which is transmitted through the UV receiving device from being received by the object.

Further, this invention provides a method of measuring UV intensity and dose by using the UV detector described above, wherein the UV detector is located at an arbitrary measuring position on an object and the UV intensity and dose at the measuring position is measured.

DESCRIPTION OF THE ACCOMPANYING DRAWINGS

Preferred embodiments of this invention will be described in details based on the followings, wherein.

DESCRIPTION OF PREFERRED EMBODIMENTS

This invention is to be described in details. Descriptions are sometimes made while referring to the drawings in which those having the same functions carry the same reference numerals throughout the drawings, for which explanations may be omitted.

The UV detector includes first and second embodiments shown below.

[UV Detector as a First Embodiment of the Invention]

A UV detector as a first embodiment of this invention is a UV detector which is located on an arbitrary measuring position on an object and which measures UV intensity and dose at the measuring position, wherein the receptor includes a UV photo-receiving device having a photosemiconductive layer containing at least one of elements of Al, Ga and In, and nitrogen and a UV untransmissive member having a function of preventing UV which is transmitted through the UV photo-receiving device from being received by the object.

Figure 1:
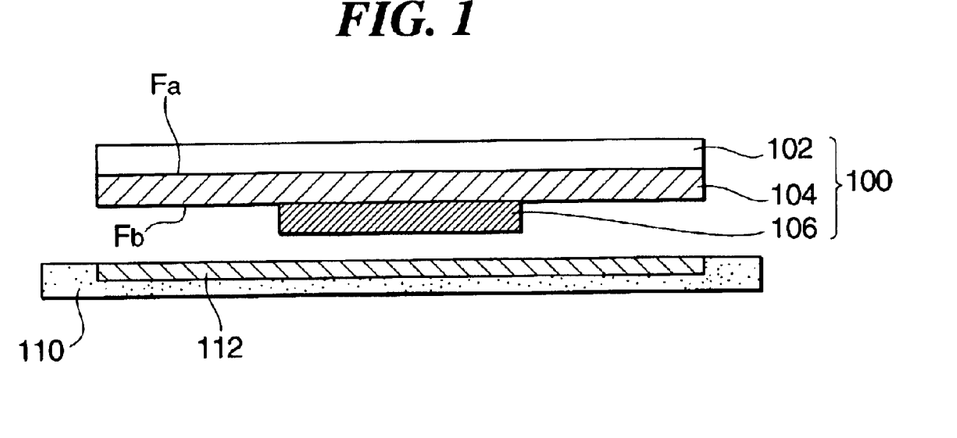
FIG. 1 is an enlarged cross-sectional view showing the structure of a UV detector as a first embodiment according to this invention.

FIG. 1 is an enlarged cross-sectional view showing the structure of a UV detector as a first embodiment according to this invention. FIG. 1 shows a UV detector having a photo-receiving surface at $F_a$.

As shown in FIG. 1, the semiconductor photo-receptor includes a UV receiving device 100 in which a conductive substrate 102, a photosemiconductive layer 104 and an electrode 106 are laminated successively, and a UV untransmissive member 110.

<UV Photo-receiving Device>

In the UV receiving device 100 according to this invention, incident light is absorbed to the photosemiconductive layer 104 and detected as a photo-current between the conductive substrate 102 and the electrode 106. Accordingly, it is necessary for the UV receiving device 100 that light enters from one of the photo-receiving surface $F_a$ and the photo-receiving surface $F_b$ shown in FIG. 1 and reaches the photosemiconductive layer 104. Thus, the conductive substrate 102 is formed of a transparent material when light enters the photo-receiving surface $F_a$, while the electrode 106 is formed of a transparent material when the light enters the photo-receiving surface $F_b$. The term "transparency" means a property of allowing to transmit (for example at a transmittance of 10% or more and, preferably, 30% or more) light at a high rate in a predetermined wavelength region, for example, an ultra-violet region used in the UV receiving device 100. This is applicable also in the following descriptions.

(Conductive Substrate)

For the conductive substrate 102, the substrate itself may be conductive or the surface of an insulative support may be applied with conductive treatment, or the substrate may be crystalline or amorphous. The conductive substrate 102 having conductivity in the substrate itself can include metals such as aluminum, stainless steel, nickel or chromium and alloy crystals thereof, as well as semiconductors such as Si, GaAs, GaP, GaN, SiC and ZnO.

Further, the insulative support can include, for example, polymer film, glass, quartz and ceramics. The conductive treatment for the insulative support may be applied by film-forming the metal referred to in the concrete examples for the conductive substrate 102, or gold, silver or copper by vapor deposition, a sputtering method or an ion plating method.

As shown in FIG. 1, in a case of having the photo-receiving surface at $F_a$, it is necessary that the conductive substrate 102 is transparent. In view of the above, the transparent substrate for the conductive substrate 102 having transparency (hereinafter referred to as a transparent conductive substrate) can include transparent inorganic materials such as glass, quartz, sapphire, MiO, SiC, ZnO, LiF and $CaF_2$, or film or plate-like transparent organic resins such as fluoro resin, polyester, polycarbonate, polyethylene, polyethyelen terephthalate and epoxy, as well as optical fibers or selfoc optical plate.

The transparent support, when it is conductive by itself, can be used as the transparent conductive substrate 102 as it is but conductive treatment or formation of a transparent electrode is necessary if the support is not conductive. The conductive treatment or formation of the transparent electrode can be conducted by use of a transparent conductive material such as ITO, zinc oxide, tin oxide, lead oxide, indium oxide and copper iodide, and by way of the method such as vacuum deposition, ion plating or sputtering, or forming a thin film to such an extent as providing translucency by vacuum-depositing or sputtering of metals like Al, Ni or Au.

(Photosemiconductive Layer)

The photosemiconductive layer 104 contains at least one of elements of Al, Ga and In, and N and, as required, other components.

The photosemiconductive layer 104 may either be unsingle crystalline or single crystalline. In the case of the unsingle crystalline state, it may be amorphous or microcrystalline or in a state of mixing them.

In the case of the crystalline state, the crystal system may be one of tetragonal system, or hexagonal system, or may be in a state where plural crystal systems are mixed. The crystals may be those grown into a columnar shape or those showing a single peak in the X-ray diffraction spectra in which the crystal face is highly oriented, or single crystals.

In a case where the photosemiconductive layer 104 is an unsingle crystal system, the photosemiconductive layer 104 may contain 0.5 at. % to 50 at. % of hydrogen or may contain halogen atoms of single coordination. When the hydrogen content in the photosemiconductive layer 104 is less than 0.5 at. %, it is insufficient to eliminate bonding defects at the crystal grain boundary or bonding defects or unbonded sites in the amorphous phase by bonding with hydrogen thereby inactivating the defect energy level formed in the band, so that bonding defects or structural defects increase to lower the dark resistance and decrease photosensitivity, and the UV receiving device 100 may not be able to function practically.

On the other hand, when the hydrogen content in the photosemiconductive layer 104 exceeds 50 at. %, its electric characteristic is degraded and a mechanical property such as hardness is sometimes lowered. Further, the photosemiconductive layer 104 tends to be oxidized to worsen the weather proofness.

The hydrogen content (at. %) in the semiconductor layer can be measured for the absolute value by hydrogen forward scattering (HFS). Further, the hydrogen content can also be estimated by measuring the amount of hydrogen released by heating. Further, in the production step for the UV receiving device 100 in this invention, the hydrogen content in the photosemiconductor can be measured easily by IR absorption spectra, by forming a similar photosemiconductive layer to a substrate transparent to IR rays such as silicon or sapphire simultaneously with formation of the photosemiconductive layer 104. The hydrogen bonded state can also be recognized by IR absorption spectra.

The structures usable for the hydrogen-containing photosemiconductive layer 104 can include, for example, those of obscure halo pattern with no ring-like diffraction pattern at all completely lacking in the long range order in transmission electron diffraction pattern, those in which ring-like diffraction pattern is observed in the halo pattern and, further, those in which bright spots are observed therein. In such a photosemiconductive layer 104, peaks are often scarcely obtained in the X-ray diffractiometry that measures a wider range than the transmission electron diffractiometry.

Further, they also include those in which a number of bright spots are observed together with the ring-like diffraction pattern in the transmission electron diffraction pattern and, further, those almost having only the spotwise bright spots in which peaks of polycrystals or peaks with the highest peak intensity being weak compared with single crystals and other weak peaks of other face orientation are mixed together. Further, they also include those showing X-ray diffraction spectra almost having one phase orientation.

In the IR absorption spectroscopy for the hydrogen-containing photosemiconductive layer 104, bonding peaks with hydrogen are present in which the half-width of the oscillation absorption peak for the bonding between the group III atom (Al, Ga and Zn) and N atom is 150 cm$^{-1}$ or more in a case where it mainly includes an amorphous structure and the half value is 100 cm$^{-1}$ or less in a case of a microcrystalline structure. The half width means a width at the ½ height for the intensity in the absorption band including plural peaks for absorption mainly of bondings between IIIa group atom and N atom, excluding the highest intensity and the background.

The size of the microcrystals is 5 nm to 5 µm in diameter, which can be measured by X-ray diffractiometry or electron diffractiometry and shape measurement by use of electro-microscopic photography for the cross section.

As the material for the photosemiconductive layer 104, organic metal compounds containing one or more of elements selected from Al, Ga and In can be used.

The organic metal compound can include, for example, trimethyl aluminum, triethyl aluminum, tertiary butyl aluminum, trimethyl gallium, triethyl gallium, tertiary butyl gallium, trimethyl indium, triethyl indium, and tertiary butyl indium in the form of liquid or solid which is evaporated and can be used solely or in a mixed state by bubbling with a carrier gas. As the carrier gas, hydrogen, $N_2$, hydrocarbons such as methane or ethane and halogenated carbon such as $CF_4$ and $C_2F_6$ can be used.

As the nitrogen material, $N_2$, $NH_3$, $NF_3$, $N_2H_4$ or methyl hydrazine can be used in the form of a gas or liquid by evaporating or bubbling the same with a carrier gas.

In the composition for the photosemiconductive layer 104, it is preferred that the relation between the sum m for the amount of the group III element and the amount n of nitrogen satisfies the relation: $0.5:1.0 \leq m:n \leq 1.0:0.5$. Out of the range described above, those portions in the form of tetrahedral bonding is decreased while defects are increased in the bonding between the group III element and the group V element (N), and it may not function as a favorable photosemiconductive layer 104.

The optical gap of the photosemiconductive layer 104 can be varied arbitrarily by the mixing ratio of the group III elements. Based on GaN:H as a reference, when it is intended to be larger than 3.2 to 3.5 eV, it can be increased to about 6.5 eV by adding Al whereas when it is intended to be 3.2 eV or less, it can be decreased to about 1.9 eV by adding In, while changing the wavelength region with the transparent state as it is.

The optical band gap is determined from the plot of the wavelength (eV) and the square of absorption coefficient (αe) at the extrapolation point for the linear portion of low energy. Alternatively, it may be at a wavelength (eV) with the absorption coefficient of 10,000 cm$^{-1}$. The absorption coefficient is determined by using the absorbance excluding the background or by measuring the film thickness dependence.

Further, various elements can be doped in the film for p, n-type control in the photosemiconductive layer 104.

The element usable for n-type that can be doped includes Li in the group Ia, Cu, Ag, Au in the group Ib, Mg in the group IIa, Zn in the group IIb, Si, Ge, Sn, Pb in the group IVa and S, Se, Te in the group VIa.

The element usable for p-type that can be doped includes Li, Na, K in the group Ia, Cu, Ag, Au in the group Ib, Be, Mg, Ca, Sr, Ba, Ra in the group IIa, Zn, Cd, Hg in the group IIb, C, Si, Ge, Sn, Pb in the group IVa, S, Se, Te in the group VIa, Cr, Mo, W in the group VIb and Fe, Co, Ni in group VIIIa.

It is necessary that hydrogen in the photosemiconductive layer 104 for passivation of the defect energy level is more selectively bonded to the group III element and the nitrogen element than the dopants in order that hydrogen is not bonded to the dopants to inactivate them. In view of the above, Si, Ge or Sn is particularly preferred as the element for n-type use, while Be, Mg, Ca, Zn or Sr is particularly preferred as the element for p-type use.

Upon doping, $SiH_4$, $Si_2H_6$, $GeH_4$, $GeF_4$, $SnH_4$ can be used for n-type, $BeH_2$, $BeCl_2$, $BeCl_4$, cyclopentadienyl magnesium, dimethyl calcium, dimethyl strontium, dimethyl zinc or diethyl zinc can be used for p-type in a state of gas. When the element described above is doped to the photosemiconductive layer 104, known methods such as thermal diffusion and ion implantation can be adopted.

As shown in FIG. 1, the UV receiving device 100 according to this invention can be simply formed into a Schottky type device by forming a single layered photosemiconductive layer 104 or prepared as a pn diode constitution or pin constitution to further enhance the efficiency.

The photosemiconductive layer 104 may be constituted with an n- or p-type photosemiconductive layer containing at least one of elements of Al, Ge and In, and nitrogen (and hydrogen), a p$^+$- or n$^+$-layer further applied with doping at a high concentration may be inserted, or a p$^-$- or n$^-$-layer applied with doping at a low concentration may be inserted.

Further, the photosemiconductive layer 104 may be of a multi-layered structure. In this case, in the photosemiconductive layer 104 for the purpose of transparency and forming a barrier, each of the p-photosemiconductive layer, the i-photosemiconductive layer and the n-photosemiconductive layer may include a composition of Al, Ga, In and N different from each other, which can be represented as $Al_xGa_yIn_z$ (x=0 to 1.0, y=0 to 1.0, z=0 to 1.0) or each of the p-photosemiconductive layer, the i-photosemiconductive layer and the n-photosemiconductive layer may include plural compositions of $Al_xGa_yIn_zN:H$ (x=0 to 1.0, y=0 to 1.0, z=0 to 1.0).

(Method of Forming Photosemiconductive Layer)

Figure 2:
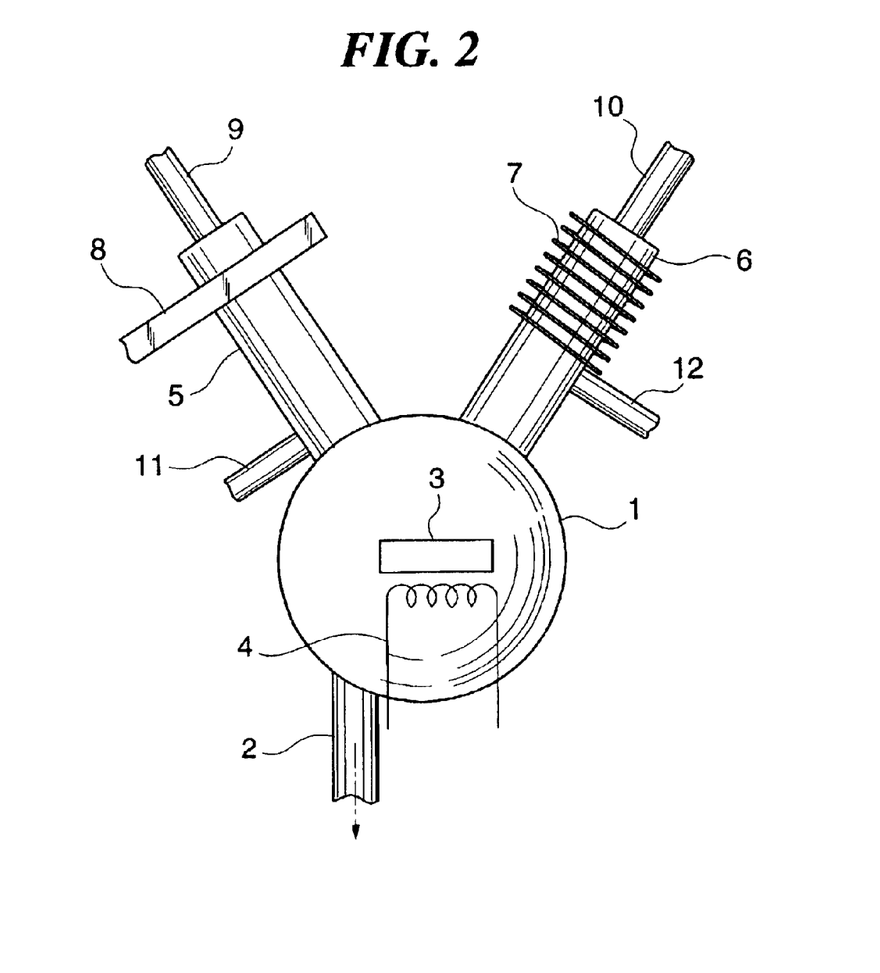
FIG. 2 is a schematic constitutional view of a layer forming apparatus for forming a photosemiconductive layer.

The method of forming the photosemiconductive layer 104 is to be explained with reference to FIG. 2 but the method is not restricted only thereto. FIG. 2 is a schematic constitutional view for a layer forming apparatus that forms a photosemiconductive layer 104. The layer forming apparatus uses plasmas as an activation unit. As shown in FIG. 2, the layer forming apparatus has a chamber 1 capable of evacuation, an exhaust port 2, a substrate holder 3, a heater 4 for heating the substrate, quartz tubes 5 and 6 connected with the chamber 1, high frequency coils 7, a microwave guide tube 8, gas introduction tubes 9 and 10 in communication with the quartz tubes 5, 6, respectively, and gas introduction tubes 11, 12 connected with the quartz tubes 5, 6 respectively. Further, as will be described later, the layer forming apparatus can form a surface layer having a predetermined composition.

In the layer forming apparatus, $N_2$ is used, for example, as a nitrogen element source and introduced from the gas introduction tube 9 to the quartz tube 5. For example, microwaves at 2.45 GHz are supplied to the microwave guide tube 8 connected with a microwave oscillator (not illustrated) using a magnetron, to generate electric discharging in the quartz tube 5. For example, $H_2$ is introduced from another gas introduction tube 10 into the quartz tube 6. Radio frequency waves at 13.56 MHz are supplied from a radio frequency oscillator (not illustrated) to the radio frequency coils 7 to generate electric discharging in the quartz tube 6. By introducing, for example, trimethyl gallium from the gas introduction tube 12 disposed at the downstream to the discharging space, a photosemiconductive layer 104 including gallium nitride can be formed on the conductive substrate 102 set on a substrate holder 3.

While trimethyl gallium is introduced from the gas introduction tube 12, an organic metal compound containing indium or aluminum may be used instead of it, or such compounds may be mixed. Further, the organic metal compounds may be introduced in admixture from the gas introduction tube 11 or they may be introduced separately.

The temperature for the conductive substrate 102 is preferably 100° C. to 600° C. Generally, when the temperature of the conductive substrate 102 is high and/or the flow rate of the group III starting material gas is small, a photo-microcrystalline semiconductor layer 104 can be formed easily. Further, when the temperature of the conductive substrate 102 is lower than 300° C. and the flow rate of the group III starting material gas is small, a microcrystalline photosemiconductive 104 is formed easily. Also in a case where the substrate temperature is higher than 300° C. and the flow rate of the group III starting material gas is larger than that under the low temperature condition, a microcrystalline photosemiconductive layer 104 is formed easily. Further, when $H_2$ discharging is conducted, for example, microcrystallization for the photosemiconductive 104 can be proceeded further than the case of not conducting $H_2$ discharging.

Further, an amorphous or microcrystalline nitride semiconductor of arbitrary conduction types such as n-type and p-type can be obtained by introducing a gas containing at least one of elements selected from C, Si, Ge and Sn or a gas containing at least one of elements selected from Be, Mg, Ca, Zn and Sr from the downstream to the discharging space (gas introduction tube 11 or gas introduction tube 12). In a case of introducing the C element, carbon of the organic metal compound may also be used depending on the conditions.

In the layer forming apparatus described above, the active nitrogen or active hydrogen formed by the discharging energy can be controlled independently, or a gas containing nitrogen and hydrogen atoms together such as $NH_3$ may also be used. Further, $H_2$ may also be added. Further, a condition of liberating to form active hydrogen from an organic metal compound may also be adopted. With the procedures described above, since activated atoms of the group III and nitrogen atoms are present under the controlled state on the conductive substrate 102 and the hydrogen atoms convert methyl groups or ethyl groups into inactive molecules such as methane or ethane, amorphous or microcrystalline film incorporating no substantial carbon or an extremely small amount of carbon, if any, with restrained film defects can be formed.

In the layer forming apparatus described above, the activation unit may be a high frequency oscillator, a microwave oscillator, an electro cyclotron resonance system or a helicon plasma system, which may be used alone or two or more of them may be used. Further, such two units may be two microwave oscillators or two high frequency oscillators. Further, while the radio frequency oscillator and the microwave oscillator are used in FIG. 1, both of the two oscillators may be microwave oscillators or both of them may be radio frequency oscillators. Furthermore, the electro cyclotron resonance system or the helicon plasma systems may be used for both of the two units. In the radio frequency wave discharging by the radio frequency oscillator, it may be an induction type or a capacitance type.

In a case of using different activation unit (excitation unit), it is necessary that electric discharging can be generated simultaneously under an identical pressure, and a pressure difference may be made between the discharging portion and the layer forming portion (film formation portion) in the chamber 1. Further, in a case of conducting activation under an identical pressure, when different activation units (excitation units), for example, the microwave oscillator and the radio frequency oscillator are used, the excitation energy for excited species can be changed greatly, which is effective for the control of the film quality.

The photosemiconductive layer 104 can be formed in an atmosphere where at least hydrogen is activated by use of, for example, reactive vapor deposition, ion plating or reactive sputtering.

(Electrode)

The electrode 106 is formed as a counter electrode to the conductive substrate 102. For the electrode 106, metals such as Al, Ni, Au, Cr, Co, Ag and Pt, as well as alloy crystals or multi-layered films thereof can be used. As described above, in a case where the photo-receiving surface is at $F_b$, it is necessary that the electrode 106 has transparency. Accordingly, transparent conductive materials such as ITO, zinc oxide, tin oxide, lead oxide, indium oxide, and copper iodide can be used as the transparency electrode. In a case where the incident light is at 300 nm or less, those formed by forming metals such as Al, Ni, Au, Cr, Cu, Ag and Pt into such thin films by vapor deposition or sputtering that light can be transmitted therethrough are used. The thickness of the film is from 5 nm to 100 nm. If the film thickness is excessively thin, the light transmittance is high but the electric resistance increases. On the other hand, if the thickness is excessively large, the film does not transmit light.

(Surface Layer)

In the UV receiving device 100 according to this invention, a surface layer (not illustrated) may be disposed with an aim of protecting the UV receiving device 100.

The surface layer has a function of at least protecting the active portion of the UV receiving device 100 (conductive substrate 102, photosemiconductive layer 104 and electrode 106) against physical and chemical stimulations. For example, the surface layer serves to protect the device against physical damages, and can mitigate effects that the active portion of the UV receiving device 100 undergoes by humidity or chemical substances. Further, it also functions as a protection layer in fabrication of the integrated UV receiving device 100. Thus, since the UV receiving device 100 in this invention is excellent in durability and moisture proofness, the working life can be increased.

The surface layer having the protective function has no particular restriction and any of inorganic materials, for example, oxides, nitrides and organic polymer materials can be used. Further, the film thickness is preferably 0.01 to 500 $\mu$m and, preferably, 0.1 to 500 $\mu$m. In a case where the photo-receiving surface is at $F_b$, a surface layer at least not absorbing the light to be received and detected by the photosemiconductive layer 104 is used.

A preferred surface layer may be made, for example, of quartz or silica glass, silicon nitride film or sapphire, or it may be silicon resin. Such materials may be coated by dipping or spraying and then heated to be cured, or may be reacted to form a cured product. Alternatively, it may be formed as a film by a plasma CVD method or the like. Further, the surface layer may also have a laminate structure by bonding the material previously formed into a plate-like shape with a transparent adhesive or fusing the same by utilizing heat.

Further, the material constituting the surface layer may also be organic compounds capable of transmitting UV. The organic compounds can include, for example, polyethylene, polypropylene, polycarbonate, polystyrene, polyester and acrylic resin. When the organic compound described above is formed as the surface layer, it may be dissolved into an appropriate solvent, coated and dried, or it may be heated to a melting point or a softening point and then coated or appended. Further, it may be formed by a vacuum m deposition method or a plasma polymerization method. Further, the organic compound may be formed as a surface layer having a laminate structure by molding the organic compound into a plate-like shape and then bonding with a transparent adhesive or fusing the same by utilizing heat.

Further, for the surface layer, a film including nitrides of at least one of elements of Al, Ga and In, and nitrogen is preferred in view of the transparency in the UV region, physical strength, chemical stability, heat resistance and electric insulation. Particularly, since the nitride film can be formed at a low temperature, the same apparatus and the same method as used for the photosemiconductive layer 104 described previously can be utilized. Further, hydrogen may be incorporated in the film. Further, doping may be applied for adjusting the insulation property. As the doping element, at least one element selected from C, Si, Ge and Sn, or at least one element selected from Be, Mg, Ca, Zn, Sr (at least one) may be used.

In a case where the nitride film is intended to have absorption on the shorter wavelength region than the wavelength region for which the photosemiconductive layer 104 has sensitivity, the amount of elements with the smaller atom number is increased and the amount of elements with a larger atom number is decreased in the elements of Al, Ga and In. That is, when the photosemiconductive layer 104 is represented by $Al_xGa_{1-x}N$ and the surface layer is represented by $Al_yGa_{1-y}N$, the absorption wavelength region of the surface layer changes to the shorter wavelength by making x smaller than y. As a result, in a case where the photo-receiving face is at $F_b$, a UV photo receiving device 100 of selective sensitivity having no sensitivity for the shorter wavelength and the longer wavelength with a certain wavelength being as a peak can be produced. For example, in a case where AlN is used as the surface layer, since absorption starts to rise from 200 nm, it can be applied to a UV receiving device 100 having sensitivity from 180 nm to longer wavelength.

<UV Untransmissive Member>

The UV untransmissive member 10 has a function of preventing the object from receiving UV which is transmitted through the UV receiving device 100. For this purpose, the UV untransmissive member 110 usually has a measuring position setting surface in contact with the object when setting the UV detector to the object. The measuring position setting surface is advantageously formed conforming with the surface shape at an arbitrary measuring position on the object.

The UV receiving device 100 (among all, photosemiconductive layer 104) explained above absorbs almost all of the incident UV but sometimes transmits UV in a longer wavelength region. The transmitted UV entering into the object is reflected or scattered on the surface and then again applied to the photosemiconductive layer 104, thereby resulting in a problem of changing the spectral sensitivity characteristic or sensitivity of the UV receiving device 100. Particularly, depending on the color of the object, the extent of reflection or scattering differs greatly to increase the amount of change, making accurate measurement for the UV-application difficult. In order to solve the problem for the change of the spectral sensitivity characteristic or the sensitivity, in the UV detector of this invention, there is disposed the UV untransmissive member 110 having a function of preventing the UV that should be transmitted through the UV receiving device 100 from being received by the object.

In this text, "UV not transmitting" in the UV untransmissive member 110 means a property of not transmitting the light in the UV region being transmitted through the UV receiving device 100 at a high rate. The transmittance in this invention, although depending on the thickness of the UV untransmissive member 110, is preferably 30% or less, more preferably, 10% or less and, particularly preferably, 2% or less irrespective of the thickness.

The UV untransmissive member 110 also has a function to prevent the UV reflected or scattered at the surface of the object from being applied to the photosemiconductive layer 104.

With such a function, if the UV being transmitted through the UV receiving device 100 should also be transmitted through the UV untransmissive member 110 although at a low ratio, since the UV, after reflection or scattering on the surface of the object, enter again into the UV untransmissive member 110, they are scarcely applied to the photosemiconductive layer 104.

For the UV untransmissive member 110, those materials at least not transmitting the light in the UV region are used and those materials not transmitting light over a range from UV region to the visible light region are preferred. The color of the materials is preferably black but any other color such as yellow, orange, red or brown that transmits fewer UV can also be used. Those having a uniform wavelength dependence in the UV-region may also be used.

As the materials for the UV untransmissive member 110, metals, ceramics, glass or plastics may be used specifically. Further, resins in which fine powder of white, black or color is dispersed may also be used. Further, a UV absorbent may be added to the material transmitting UV. In a case where the object on which the UV intensity and dose are measured is a human body, it is particularly preferred to use a plastic material for the UV untransmissive member 110 in view of influence on human bodies, for example, skin allergic reactions. Further, the measuring position setting surface is advantageously formed conforming with the surface shape of the arbitrary measuring position on the object.

The UV untransmissive member 110 is designed and disposed such that UV that should be transmitted through the UV receiving device 100 are not transmitted and do not interrupt light incident to the photosemiconductive layer 104. For example, in the UV receiving device 100 shown in FIG. 1, in a case where the receiving surface is at $F_a$, the UV untransmissive member 110 is preferably disposed at a position opposing to the electrode 106, in contact or not in contact with the electrode 106.

Further, it is preferred in the UV untransmissive member 110 that a portion at least for receiving UV which is transmitted through the UV photo-receiving device preferably includes a region 112 not reflecting the UV. The region 112 not reflecting the UV may be provided by applying anti-reflection treatment to a specified region of the UV untransmissive member 110, or may be constituted with a material having a property of not reflecting the UV, separately from the UV untransmissive member 110.

The anti-reflection treatment method can include, for example, roughening with filing or sand blasting.

Further, the material having a property of not reflecting the UV may include titanium oxide or zinc oxide having absorption in the ultraviolet region, as well as those having absorption in a range from ultraviolet to visible regions such as black paint and carbon black.

In a case where the region 112 not reflecting UV is constituted with a separate material separate from the UV untransmissive member 110 having the property of not reflecting the UV, it may be disposed by bonding a film, tape or seal-like material to a predetermined region, or it may be disposed as shown in FIG. 1 by previously forming a concave in a specified region and containing the material into the concave. Further, it may be disposed by preparing a coating solution and forming a coating layer by a known coating method.

[UV Detector as a Second Embodiment of the Invention]

The UV detector as a second embodiment according to this invention has a feature of providing, in the UV detector as the first embodiment according to this invention, a protection member for protecting the UV photo-receiving device and at least having a light incident surface for entering UV to be received by the photosemiconductive layer.

Figure 3:
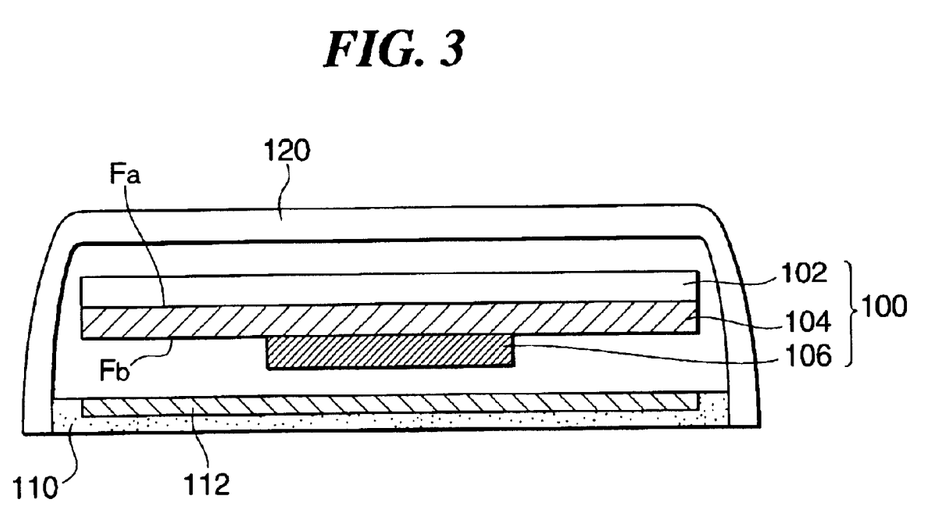
FIG. 3 is an enlarged cross-sectional view showing the structure of a UV detector as a second embodiment according to this invention.

FIG. 3 is an enlarged cross-sectional view showing a structure of a UV detector as a second embodiment of this invention. FIG. 3 shows a UV detector having a photo-receiving surface $F_a$ for UV and forming a casing that incorporates a UV receiving device 100 with a UV untransmissive member 110 and a protection member 120.

As shown in FIG. 3, the semiconductor receptor includes a UV receiving device 100 in which a conductive substrate 102, a photosemiconductive layer 104 and an electrode 106 are laminated successively, a UV not transmitting member 110 and a protection member 120. Since detailed descriptions for the UV receiving device 100 and the UV untransmissive member 110 are identical with that of the UV detector as the first embodiment shown in FIG. 1, they are omitted.

<Protection Member>

The protection member 120 protects a UV receiving device 100 and at least has a light incident surface for entering UV to be received by the photosemiconductive layer 104. The protection member 120 protects the UV light device 100 optically, mechanically and chemically. For example, when the UV receiving device 100 has sensitivity to wavelength other than that of UV, a function of shielding light at a predetermined wavelength may be added to the light incident surface of the protection member 120.

The light incident surface may not necessarily be flat but may be a curved surface, for example, as shown in FIG. 3. It is apparent that the light incident surface is formed of a UV transmitting material and it is advantageous that the surface has such a shape as not scattering light from a viewpoint of accurate measurement for the UV intensity and dose. Further, the protection member 120 may also have a measuring position setting surface to be set on an object on which the UV intensity and dose are measured and it is preferred to form the measuring position setting surface conforming with the surface shape at an arbitrary measuring position on the object.

As the material for the protection member 120, metal, ceramic, glass, plastic or the like may be used. It is preferred that the material of the protection member 120 is a plastic material when the UV detector is set to a human body, from a viewpoint of the effects given to the human body such as skin allergic reactions or in view of portability.

There is no particular restriction on the specific constitution of the protection member 120 and it may be constituted as shown in FIG. 3 that a UV receiving device 100 is incorporated by the UV untransmissive member 110 having the measuring position setting surface and the protection member 120. As described above, the protection member 120 may be integrated together with the UV untransmissive member or may be independent of the UV untransmissive member 110. In a constitution where the protection member 120 and the UV untransmissive member 110 are integrated, the UV untransmissive member 110 and the protection member 120 are preferably manufactured by a resin molding method.

In a case where the protection member 120 is independent of the UV untransmissive member 110, the form of the protection member 120 can specifically include, for example, (1) a box-like shape (casing) in which the UV receiving device 100 is fixed and incorporated by use of adhesive or the like (welding or soldering may also be used, particularly, in a case of metal material); (2) a single plate-like member on which the UV receiving device 100 is secured and the UV receiving device 100 is resin-encapsulated only at the terminal portions or resin-encapsulated entirely; (3) two plate-like members which sandwich the UV receiving device 100 therebetween, and fix and incorporate the UV receiving device 100; (4) a member having a predetermined hole in which the UV receiving device 100 is buried, fixed and incorporated; and (5) a plastic resin material for resin-encapsulating the periphery to incorporate the UV receiving device 100.

The protection member 120 may be adapted to partially expose the UV receiving device 100 so that UV are received by the photosemiconductive layer 104 in the UV receiving device 100. In this case, a portion of the exposed UV receiving device 100 constitutes a portion of the light incident surface. Further, the UV receiving device 100 may be adapted to be completely incorporated and tightly sealed. In this case, at least the light incident surface of the protection member 120 is formed of a UV transmitting material. For example, as the material for transmitting UV up to about 300 nm, soda glass, boro-silicate glass or polymeric resin such as acrylic, polycarbonate or silicone resin with no addition of UV absorbent can be used. As the material transmitting UV near 200 nm, silica glass, quartz, polymeric resin or film such as polyethylene or polypropylene.

A gap between the protection member 120 and the UV receiving device 100 may be left as a space or it may be filled with a resin. In a case where the space is provided relative to the UV receiving device 100, the space may be filled either with a gas such as nitrogen or Ar or with a liquid such as oil.

In a case where the protection member 120 or the UV untransmissive member 110 has the measuring position setting surface, the measuring position setting surface is preferably provided with a fixing unit for close contact with the measuring position such as both-face tape, heat resistant tape, suction disk, clip, button or hook in view of portability and since the receptor can be located free with no restriction on the position for location (measuring position on the object) and on the surface shape thereof.

In the UV detector according to this invention, the change of spectral sensitivity characteristic or output can be prevented by the provision of the UV untransmissive member 110 as described above. This enables accurate measurement for the UV intensity and dose irrespective of the color of the object on which the measurement is carried out.

The UV receiving device of this invention includes a protection member that protects the UV receiving device and has at least a light incident surface for incidence of UV received by the photosemiconductive layer.

Further, the UV untransmissive member and the protection member may be integrated.

At least a portion of the UV untransmissive member that receives UV which is transmitted through the UV receiving device includes a region not reflecting the UV.

The UV detector may have a thickness of 7 mm or less.

In the UV detector according to this invention, the thickness in both of first and second embodiments is preferably 7 mm or less and, more preferably, 5 mm or less, particularly preferably, 2 mm or less. Since the UV detector according to this invention is reduced in thickness, it can be located at any measuring position irrespective of the object on which the measurement is carried out. Further, since it is possible to measure the UV applied at a height substantially equal with that of the object, errors can be decreased.

[Method of Measuring UV Intensity and Dose in the Invention]

In the method of measuring the UV intensity and dose according to this invention, the UV detector according to this invention described above is located at any arbitrary measuring position on an object and the UV intensity and dose at the measuring position is measured. Since the UV detector according to this invention described above is used in the method of measuring the UV intensity and dose according to this invention, there are no restrictions on the object on which the measurement is carried out and on the measuring position thereof and further, errors can be decreased, so that the UV intensity and dose at the measuring position can be measured accurately.

EXAMPLE

This invention is to be explained more specifically with reference to examples but the invention is not restricted to the following examples.

[Preparation of UV Receiving Device]

A UV photo-receiving device was manufactured by using the layer forming apparatus shown in FIG. 2.

Method of Preparing Conductive Substrate

An ITO electrode of 2 mm×2 mm with 200 nm thickness was formed on a cleaned Corning 7059 (glass substrate, manufactured by Corning, Inc.) by a sputtering method, to prepare a conductive substrate.

Step for Forming Photosemiconductive Layer

A photosemiconductive layer was formed on the conductive substrate by the layer forming apparatus described above. The conductive substrate was placed on a substrate holder 3 in the chamber 1. After evacuating the inside of the chamber 1 by way of the exhaust port 2, the conductive substrate was heated to 380° C. by the substrate heater 4.

An $N_2$ gas was introduced at 2000 sccm from a gas introduction tube 9 into a quartz tube 5 of 25 mm in diameter, microwaves at 2.45 GHz were set to an output of 250 W by way of a microwave guide tube 8 to conduct electric discharging while matching by a tuner. Reflection waves at this instance were at 0 W.

An $H_2$ gas was introduced at 1000 sccm from a gas introduction tube 10 into a quartz tube 6 of 30 mm in diameter. The output of radio frequency power at 13.56 MHz was set to 100 W. The reflection waves were at 0 W.

In this state, vapors of trimethyl gallium (TMGa) kept at 0° C. were introduced by 0.3 sccm from the gas introduction tube 12 using hydrogen as a carrier gas passing through a mass flow controller under bubbling. Further, bis-cyclopentadienyl magnesium was introduced at 1 sccm using hydrogen as a carrier gas. Trimethyl gallium and bis-cyclopentadienyl magnesium as a dopant were joined, mixed and then introduced by the gas introduction tube 12. In this case, the reaction pressure measured by a Baratron vacuum meter was 66.6 Pa (0.5 torr). Film formation was conducted for 60 minutes to form 0.2 $\mu$m of an i-type GaN:H film (photosemiconductive layer).

Step for Forming Electrode

An Au film of 2 mm in diameter and 10 nm in thickness was formed on the thus formed GaN:H film by a vacuum deposition method, to obtain a semi-transparent electrode. Subsequently, the ITO electrode, the Au electrode and wires are fixed by conductive adhesives, to obtain a UV photo-receiving device.

Examples 1 to 4

A UV untransmissive member to be described later was disposed, as shown in FIG. 1, in a contactless state at a position opposed to the Au electrode of the UV photo-receiving device obtained by a method described above to manufacture UV detectors 1 to 4 in Examples 1 to 4. The UV untransmissive member disposed to the UV detectors 1 to 4 included four types of colored acrylic plates each of 0.4 mm thickness, specifically, (1) white opaque plate, (2) yellow transparent plate, (3) orange transparent plate and (4) black plate.

The UV detector 1 had (1) opaque white plate, the UV detector 2 had (2) transparent yellow plate, the UV detector 3 had (3) transparent orange plate and the UV detector 4 had (4) black plate, respectively.

When the transmittance of the four types of acrylic plates each of 0.4 mm in thickness was measured respectively with a spectrophotometer using an integrating sphere, it was as shown below.

(1) White Opaque Plate

20% at wavelength longer than 390 nm, 0% at wavelength shorter than 380 nm;

(2) Transparent Yellow Plate

50% at wavelength longer than 500 nm, 5% at wavelength shorter than 450 nm;

(3) Transparent Orange Plate having 30% transmission band in a range from 350 to 390 nm, 80% at a wavelength longer than 100 nm and 0% at other wavelengths;

(4) Black Plate

5% at wavelength longer than 380 nm, 0% at wavelength shorter than 360 nm.

Evaluation Experiment (Output Evaluation)

The UV detectors 1 to 4 thus manufactured were located on black paper and white paper as objects on which the measurement is carried out, white light was applied from an Xe lamp to $F_a$ in FIG. 1 being as a light receiving surface, output was measured and the difference in output depending on the color of the objects was determined. The output difference was calculated according to: (output for the black paper)/(output for the white paper)×100. The results are shown below.

UV detector 1: 0.8%

UV detector 2: 1.2%

UV detector 3: 0%

UV detector 4: 0.5%

Further, the output from each of the UV detectors 1 to 4 in a case where the object was black paper, was:

UV detector 1: +5%

UV detector 2: 0%

UV detector 3: 0%

UV detector 4: 0% as the relative values. As described above, the UV detector 1 showed a small output difference depending on the color of the object as described above but the absolute output was greater than those of the other UV detectors 2 to 4. This is an effect caused by surface reflection of an opaque white plate itself as the UV untransmissive member.

(Spectral Sensitivity Evaluation)

The thus manufactures UV detectors 1 to 4 were located to black paper and white paper as objects on which the measurement is carried out, white light from an Xe lamp was applied under spectralization to $F_a$ in FIG. 1 being as a light receiving surface, output was measured and the difference of sensitivity at 400 nm depending on the color of the objects was determined. The sensitivity difference was calculated according to (sensitivity for the black paper)/(sensitivity for the white paper)×100.

UV detector 1: 10%

UV detector 2: 5%

UV detector 3: 5%
UV detector 4: 5%

Comparative Example 1

A UV detector 5 of Comparative Example 1 was manufactured and evaluated in the same manner as in Example 1 except for not disposing the UV untransmissive member.

As a result, the output difference depending on the objects was about 10%.

Further, as a result, the sensitivity difference at 400 nm depending on the objects was about 80%.

Since the UV detectors 1 to 4 according to this invention in Examples 1 to 4 had the UV untransmissive member, the output difference was 2% or less and the sensitivity difference at 400 nm was 10% or less irrespective of the colors of the objects and they show practically preferred ranges for numerical values.

Further, when anti-reflection treatment was applied by use of a black ink to a surface of a white opaque plate opposed to the Au electrode of the UV detector 1, to form a region not reflecting UV, the absolute output shown by the UV detector 1 showed a value identical with those of the other UV detectors 2 to 4.

On the other hand, in the UV detector 5 of Comparative Example 1 not disposed with the UV untransmissive member, it was found that the output difference and the sensitivity difference at 400 nm were large and the photo-receiving characteristics were changed greatly depending on the objects on which the measurement was carried out.

This invention can provide a UV detector capable of accurately measuring the intensity of UV for a wide incident angle with no change for the spectral sensitivity characteristic or output irrespective of the colors of objects on which the measurement is carried out, as well as a method of measuring the UV intensity and dose using the UV detector.

The entire disclosure of Japanese Patent Application No. 2001-378843 filed on Dec. 12, 2001 including specification, claims, drawings and abstract is incorporated herein by reference in its entirety.

What is claimed is:

1. A UV detector for measuring UV intensity and dose which is located at an arbitrary measuring position on an object and measures UV intensity and dose at the measuring position, comprising:

a UV receiving device having a photosemiconductive layer containing nitrogen and at least one of elements of Al, Ga and In; and a UV untransmissive member having a function of preventing UV which is transmitted through the UV receiving device from being received by the object.

2. The UV detector according to claim 1, further comprising a protection member that protects the UV receiving device and has at least a light incident surface for UV received by the photosemiconductive layer.

3. The UV detector according to claim 2, wherein the UV untransmissive member and the protection member are integrated.

4. The UV detector according to claim 1, wherein at least a portion of the UV untransmissive member that receives UV which is transmitted through the UV receiving device comprises a region not reflecting the UV.

5. The UV detector according to claim 1, wherein a thickness of the detector is 7 mm or less.

6. A UV detector for measuring UV intensity and dose which is located on an object, comprising:

a UV detecting device having a photosemiconductive layer containing nitrogen and at least one of elements of Al, Ga and In; and a UV protecting member having a function of preventing the object from irradiation with UV transmitted through the semiconductor layer.

7. A method of measuring UV intensity and dose by using the UV detector comprising a UV receiving device having a photosemiconductive layer containing nitrogen and at least one of elements of Al, Ga and In, and a UV untransmissive member having a function of preventing UV which is transmitted through the UV receiving device from being received by an object on which the measurement is carried out, the method comprising the steps of:

locating the UV detector at an arbitrary measuring position on an object on which the UV intensity and dose measurement is carried out; and measuring the UV intensity and dose at the measuring position.

* * * * *

UNITED STATES PATENT AND TRADEMARK OFFICE
CERTIFICATE OF CORRECTION

PATENT NO. : 6,784,435 B2
DATED : August 31, 2004
INVENTOR(S) : Shigeru Yagi et al.

It is certified that error appears in the above-identified patent and that said Letters Patent is hereby corrected as shown below:

Title page,
Item [30], Foreign Application Priority Data, please replace "Dec. 12, 2001 (FR)" with -- Dec. 12, 2001 (JP) --.

Signed and Sealed this

First Day of February, 2005

JON W. DUDAS
*Director of the United States Patent and Trademark Office*